United States Patent
Baba et al.

(10) Patent No.: US 7,400,492 B2
(45) Date of Patent: Jul. 15, 2008

(54) MULTI-LAYERED SOLID ELECTROLYTIC CAPACITOR AND METHOD OF MANUFACTURING SAME

(75) Inventors: Hiromichi Baba, Saga (JP); Kazutoyo Horio, Saga (JP); Toshiaki Harasaki, Saga (JP); Shinji Arimori, Taku (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 11/785,289

(22) Filed: Apr. 17, 2007

(65) Prior Publication Data

US 2007/0247781 A1 Oct. 25, 2007

(30) Foreign Application Priority Data

Apr. 21, 2006 (JP) .............................. 2006-117412

(51) Int. Cl.
*H01G 9/04* (2006.01)
*H01G 9/145* (2006.01)

(52) U.S. Cl. ........................................ 361/528; 361/541

(58) Field of Classification Search ................ 361/528, 361/523, 534, 541, 529; 29/25.01, 25.02, 29/25.03
See application file for complete search history.

(56) References Cited

U.S. PATENT DOCUMENTS

| 6,970,344 | B2 * | 11/2005 | Arai et al. ................. 361/528 |
| 6,985,353 | B2 * | 1/2006 | Hirota et al. ............... 361/528 |
| 7,289,314 | B2 * | 10/2007 | Kobayashi et al. .......... 361/523 |
| 2003/0137815 | A1 * | 7/2003 | Ochi et al. ................. 361/793 |
| 2004/0246690 | A1 * | 12/2004 | Nakamura et al. .......... 361/763 |
| 2005/0070647 | A1 * | 3/2005 | Iyoshi et al. ............... 524/155 |
| 2005/0194577 | A1 * | 9/2005 | Kasuga et al. .............. 252/514 |

FOREIGN PATENT DOCUMENTS

JP          11-135367 A          5/1999

\* cited by examiner

*Primary Examiner*—Eric Thomas
*Assistant Examiner*—David M Sinclair
(74) *Attorney, Agent, or Firm*—Westerman, Hattori, Daniels & Adrian, LLP.

(57) ABSTRACT

A multi-layered solid electrolytic capacitor is furnished with a plurality of capacitor elements 6, each having an aluminum foil 1 having an anode portion 7 and a cathode portion 8 having a dielectric oxide film 2 and a cathode layer 3 successively formed on a surface of the aluminum foil 1. The capacitor elements 6 are stacked on each other. Adjacent anode portions 7 of the capacitor elements 6 are welded to one another and adjacent cathode portions 8 are electrically connected one another by a conductive paste layer 18. An insulative resin layer 16 is disposed on a boundary between the cathode portion 8 and the anode portion 7 of at least one of the capacitor elements 6 and on an adjacent region thereto.

20 Claims, 10 Drawing Sheets

MULTI-LAYERED SOLID ELECTROLYTIC CAPACITOR AND METHOD OF MANUFACTURING SAME

BACKGROUND OF THE INVENTION

1. Field of the Invention

The present invention relates to multi-layered solid electrolytic capacitors and methods of manufacturing the capacitors, and more particularly a multi-layered solid electrolytic capacitor that is capable of improving the product yield and a method of manufacturing such a capacitor.

2. Description of Related Art

A conventional multi-layered solid electrolytic capacitor has been fabricated in the following manner. As illustrated in FIG. 9, a dielectric oxide film 2 and a cathode layer 3 comprising a solid electrolyte layer 3a, a carbon layer 3b and a silver paint layer 3c are successively formed on a surface of a foil 1 of aluminum, which is a valve metal, to fabricate a capacitor element 6. Next, as illustrated in FIG. 10, a plurality of the capacitor elements 6 in a stacked state are connected to an anode terminal 12 by resistance welding and are connected to a cathode terminal 13 by conductive adhesive 17. Lastly, these components are covered with an exterior resin 14, to produce a multi-layered solid electrolytic capacitor.

When stacking the capacitor elements 6, the cathode portion 8 of one of the capacitor elements 6 is, at first, conveyed and placed onto the lead frame, and thereafter the anode portion 7 of that capacitor element 6 is joined to the anode terminal 12 by resistance welding. Thereafter, the joined anode portion 7 of the capacitor element 6 is welded to the anode portion 7 of another capacitor element 6 to be stacked thereon. This procedure is repeated to stack the capacitor elements 6 (see Japanese Published Unexamined Patent Application No. 11-135367).

In this conventional multi-layered solid electrolytic capacitor, the thickness L11 of the anode portion 7 is about 100 μm, while the thickness L12 of the cathode portion 8 is about 230 μm, as shown in FIG. 9. Thus, there is a large difference between the thickness L11 of the anode portion 7 and the thickness L12 of the cathode portion 8, and this causes the anode to be bent at the boundary between the anode portion 7 and the cathode portion 8, as illustrated in FIG. 10. Therefore, when conducting resistance welding, tensile stress and bending stress are applied to the boundaries between the anode portions 7 and the cathode portions 8 and the adjacent regions thereto (indicated by reference numeral 50 in FIG. 10), and the stresses are applied intensively to these parts. As a result, cracks develop in the boundaries between the anode portions 7 and the cathode portions 8 or in the adjacent regions of the anode portions 7, leading to an increase of leakage current in the capacitor and consequently resulting in a defective product.

In addition, when forming a solid electrolyte layer 3a, which constitutes the cathode portion 8 of the capacitor element and is made of a conductive polymer, an aluminum foil 1 on which a dielectric oxide film 2 is formed needs to be immersed to a predetermined position into a predetermined mixture solution in order to form the solid electrolyte layer 3a by polymerization. In this process, variations of the liquid level of the solution are inevitable in the current state of the art, so the end positions of the solid electrolyte layers 3a formed by the polymerization accordingly vary horizontally among the capacitor elements. As a result, there are horizontal variations in the boundary positions between the anode portions 7 and the cathode portions 8 among the fabricated capacitor elements. Moreover, even when there is almost no horizontal variation in the end positions of the polymerized solid electrolyte layers 3a, horizontal variations may sometimes be caused in the positions of the boundaries between the anode portions 7 and the cathode portions 8 since the mounting positions of the capacitor elements 6 can be displaced when they are stacked. In this way, because of the horizontal variations of the boundaries between the anode portions 7 and the cathode portions 8, a capacitor element may come into contact with an electrode to be mounted, or the opposite electrodes of the adjacent capacitor elements may come into contact with each other, which may cause short circuit defects. This problem is particularly noticeable in those among the capacitor elements 6 that are spaced apart from the anode terminal 12.

BRIEF SUMMARY OF THE INVENTION

The present invention has been accomplished in view of the foregoing circumstances, and it is an object of the present invention to provide a multi-layered solid electrolytic capacitor that can achieve a significantly improvement in the product yield by preventing leakage current from increasing and inhibiting defects resulting from short circuits, and a method of manufacturing such a capacitor.

In order to accomplish the foregoing and other objects, the present invention provides a multi-layered solid electrolytic capacitor comprising: an anode terminal; a plurality of capacitor elements stacked on one another, each of the capacitor elements comprising an anode body having an anode portion, and a cathode portion having a dielectric oxide film and a cathode layer successively formed on a surface of the anode body; and an insulative resin layer disposed on a boundary between the cathode portion and the anode portion of at least one of the plurality of capacitor elements and on an adjacent region thereto, wherein one of the anode portions that is adjacent to the anode terminal is fixed to the anode terminal by welding, adjacent ones of the anode portions are fixed to one another by welding, and adjacent ones of the cathode portions are electrically connected to one another by a conductive paste layer.

According to the present invention, the product yield of the multi-layered solid electrolytic capacitor can be significantly improved by preventing leakage current from increasing and inhibiting the defects resulting from short circuits, without causing a rise in manufacturing cost or an increase in the device size.

DETAILED DESCRIPTION OF THE INVENTION

Figure 1:
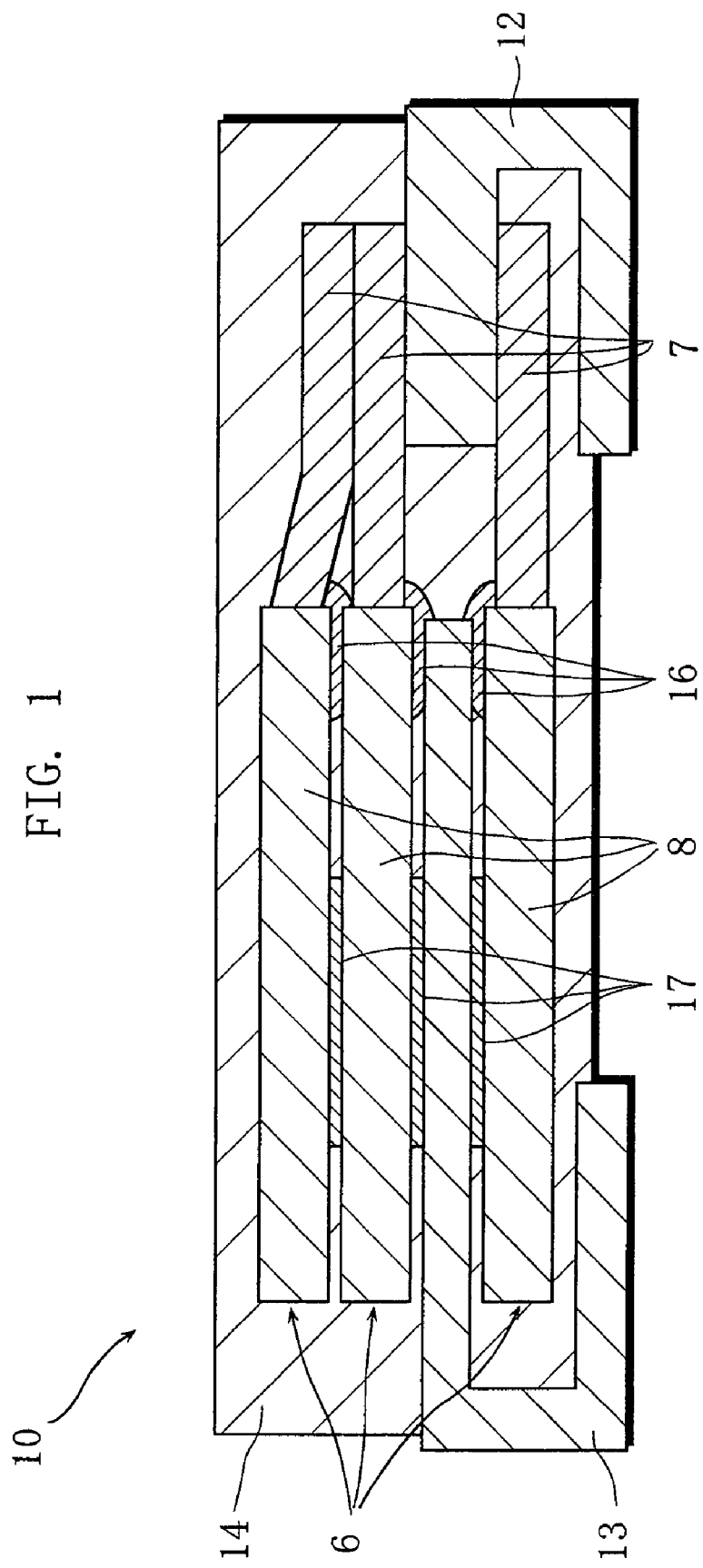
FIG. 1 is a vertical cross-sectional view of a multi-layered solid electrolytic capacitor according to the present invention.

A multi-layered solid electrolytic capacitor according to the present invention comprises an anode terminal, a plurality of capacitor elements stacked on one another, and an insulative resin layer provided for at least one of the plurality of capacitor elements. Each of the capacitor elements comprises an anode body having an anode portion, and a cathode portion having a dielectric oxide film and a cathode layer successively formed on a surface of the anode body. The insulative resin layer is disposed on a boundary between the cathode portion and the anode portion of at least one of the plurality of capacitor elements and on an adjacent region thereto. One of the anode portions that is adjacent to the anode terminal is fixed to the anode terminal by welding, adjacent ones of the anode portions are fixed to one another by welding, and adjacent ones of the cathode portions are electrically connected to one another by a conductive paste layer.

As in the foregoing configuration, when the insulative resin layer is disposed on a boundary between the cathode portion and the anode portion and an adjacent region thereto as described above, bending stress that is applied to the boundary between the anode portion and the cathode portion or an adjacent region thereto is lessened when conducting resistance welding, and therefore, the stress applied thereto becomes smaller. This makes it possible to reduce the defects originating from an increase of the leakage current in the capacitor that is caused by the cracks developed at the boundaries between the anode portions and the cathode portions or in the adjacent regions of the anode portions. Moreover, the provision of the insulative resin layer serves to keep the capacitor element and an electrode to be mounted or the opposite electrodes of the adjacent capacitor elements from easily coming into contact with each other, even when there are horizontal variations in the boundaries between the cathode portions and the anode portions or when variations arise in the mounting positions of the capacitor elements when stacking the capacitor elements. As a result, it becomes possible to reduce the short circuit defects originating from the variations in the boundaries between the cathode portions and the anode portions and the variations in the mounting positions of the capacitor elements.

Furthermore, these are achieved by simply providing the insulative resin layer, so the problem of size increase in the multi-layered solid electrolytic capacitor does not arise, or the manufacturing costs do not increase.

It is desirable that the resin layer be formed on both sides of the at least one of the capacitor elements.

When the resin layer provided on both sides of the at least one of the capacitor elements, the stress applied to the boundaries between the anode portions and the cathode portions when conducting resistance welding is more effectively alleviated than when the resin layer is formed on only one side of the at least one of the capacitor elements, because both the resin layers of the top and bottom sides serve to alleviate the stress. As a result, it becomes possible to reduce the defects due to an increase in leakage current originating from cracks that develop at the boundaries between the anode portions and the cathode portions or in the cathode portions that are adjacent thereto.

It is desirable that the resin layer be provided for the capacitor elements other than the capacitor element fixed to the anode terminal by welding.

This restriction is made in view of the following. In the capacitor element to which the anode terminal is fixed by welding, the anode portion extending from the cathode portion has a tilt angle of 0° or a very small tilt angle, so the bending stress at the boundary between the cathode portion and the anode portion is small. On the other hand, in the second capacitor element and onward, counted from the anode terminal, the tilt angle of the anode portion extending from the cathode portion increases corresponding to the difference between the thickness of the anode portion(s) and the thickness of the cathode portion(s) of the capacitor element(s) that is/are located closer to the anode terminal side than that capacitor element, and therefore the bending stress at the boundary between the cathode portion and the anode portion or in the adjacent region thereto is greater.

It is desirable that the resin layer be made of a thermosetting resin comprising an epoxy resin.

Since the epoxy resin is low in cost, the manufacturing cost of the multi-layered solid electrolytic capacitor can be kept low.

It is desirable that the resin layer have a thickness equal to or less than the thickness of the conductive paste layer.

This restriction is made in view of the following. If the thickness of the resin layer is larger than the thickness of the conductive paste layer, the angle of the bending at the boundary between the anode portion and the cathode portion will be larger when conducting resistance welding. Consequently, the stress applied to the boundary and the adjacent region becomes greater, and as a result, the number of the defective products due to leakage current increases.

In order to accomplish the foregoing and other objects, the present invention also provides a method of manufacturing a multi-layered solid electrolytic capacitor, comprising: preparing a plurality of capacitor elements, each capacitor element comprising a cathode portion and an anode portion, the cathode portion having a dielectric oxide film and a cathode layer successively formed on a surface of an anode body and the anode portion extending from the cathode portion; applying a thermosetting conductive paste on the cathode portions, and applying a thermosetting resin to a boundary between the cathode portion and the anode portion of at least one of the plurality of the capacitor elements and to an adjacent region to the boundary, and after stacking the capacitor elements, curing the thermosetting conductive paste and the thermosetting resin by heating; and fixing an anode terminal to the anode portions of the capacitor elements by welding.

In the foregoing manufacturing method, it is desirable that the resin is applied onto both sides of the at least one of the capacitor elements in the step of applying a thermosetting resin to a boundary between the cathode portion and the anode portion and to an adjacent region to the boundary.

In the foregoing manufacturing method, it is desirable that the resin be applied to the capacitor elements other than the capacitor element fixed to the anode terminal by welding in the step of applying a thermosetting resin to a boundary between the cathode portion and the anode portion and to an adjacent region to the boundary.

In the foregoing manufacturing method, it is desirable that the resin comprise an epoxy resin.

According to the above-described methods, the foregoing multi-layered solid electrolytic capacitor can be readily fabricated.

EXAMPLES

Hereinbelow, embodiments of a multi-layered solid electrolytic capacitor according to the invention will be detailed with reference to FIGS. 1 to 7.

Example 1

Configuration of Multi-Layered Solid Electrolytic Capacitor

As illustrated in FIG. 1, a multi-layered solid electrolytic capacitor 10 comprises a plurality of capacitor elements 6 (three capacitor elements in the present example) stacked on one another. An anode terminal 12 and a cathode terminal 13 are fitted between the bottommost capacitor element 6 and the second bottommost capacitor element 6. The capacitor elements 6, the anode terminal 12, and the cathode terminal 13 are covered with a synthetic resin 14 except for the bottom surfaces of the anode terminal 12 and the cathode terminal 13.

Figure 2:
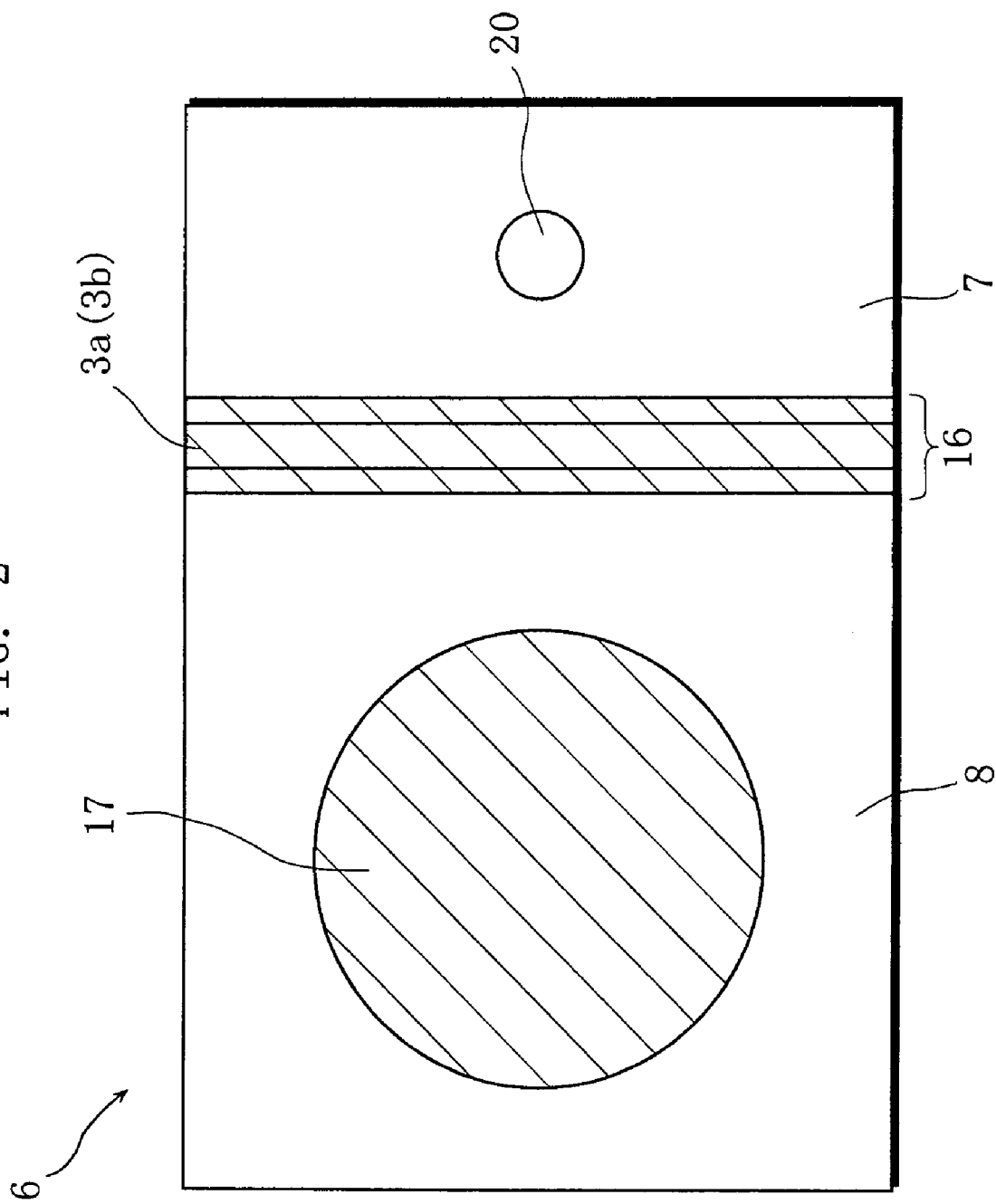
FIG. 2 is a plan view of a capacitor element used in the present invention.
Figure 3:
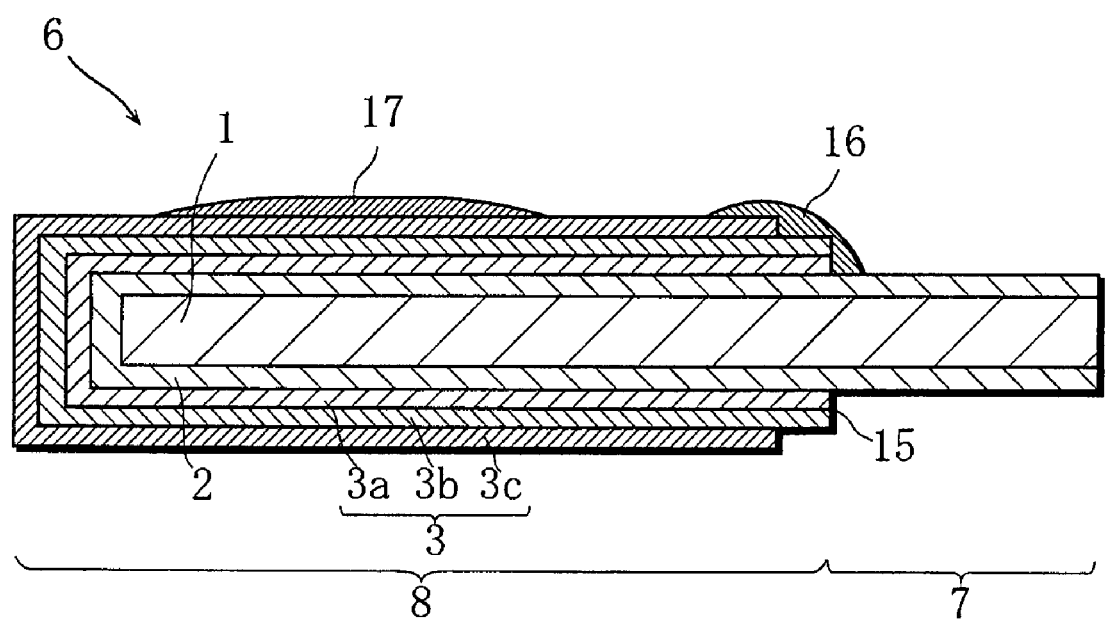
FIG. 3 is a cross-sectional view of a capacitor element used in the present invention.

As illustrated in FIGS. 2 and 3, in each of the capacitor elements 6, a dielectric oxide film 2 and a cathode layer 3 are formed on a foil 1 of aluminum, which is a valve metal, that serves as an anode body. The cathode layer 3 comprises a solid electrolyte layer 3a made of a polythiophene-based conductive polymer, a carbon layer 3b, and a silver paint layer 3c. A portion of the capacitor element 6 in which the cathode layer 3 is formed on the dielectric oxide film is a cathode portion 8, whereas a portion thereof in which the cathode layer 3 is not formed is an anode portion 7. A plurality of the capacitor elements 6, each having the just-described configuration, are stacked on one another, and with the capacitor elements 6 being in that stacked state, the anode portions 7 of the adjacent capacitor elements 6 are fixed to each other by welding while the cathode portions 8 of the adjacent capacitor elements 6 are fixed to one another by adhesive bonding with a conductive paste 17 that has adhesive properties. Thus, the multi-layered solid electrolytic capacitor 10 is formed. In FIG. 2, reference numeral 20 denotes a position to which a resistance welding rod should abut.

In each of the capacitor elements 6 used in the multi-layered solid electrolytic capacitor 10, as illustrated in FIGS. 2 and 3, an insulative resin layer 16 is formed on the boundary 15 between the cathode portion 8 and the anode portion 7 and on an adjacent region thereto, of one of the top and bottom sides. The insulative resin layer 16 is made of a thermosetting resin comprising an epoxy resin (for example, a bisphenol-F based liquid epoxy resin). Because of the presence of the insulative resin layer 16, application of bending stress to the boundary 15 between the anode portion 7 and the cathode portion 8 or to the adjacent region is lessened at the time of resistance welding, and therefore, the stress applied thereto becomes smaller. This makes it possible to reduce the defects originating from an increase of the leakage current in the capacitor that is caused by cracks developed at the boundary 15 between the anode portion 7 and the cathode portion 8 or in the adjacent region. Moreover, the presence of the insulative resin layer 16 serves to keep the capacitor element 6 and an electrode to be mounted or the opposite electrodes of the adjacent capacitor elements 6 from easily coming into contact with each other, even when there are horizontal variations in the boundaries between the cathode portions and the anode portions or when variations arise in the mounting positions of the capacitor elements 6 when stacking the capacitor elements 6. As a result, it becomes possible to reduce the short circuit defects originating from the variations in the boundaries between the cathode portions 8 and the anode portions 7 and the variations in the mounting positions of the capacitor elements.

Manufacturing Method of the Multi-Layered Solid Electrolytic Capacitor

First, a method of manufacturing the capacitor element 6 is described, which is substantially the same as the conventional methods.

Specifically, the aluminum foil 1 was subjected to a formation process at a predetermined voltage in an aqueous solution of phosphoric acid or the like at a predetermined concentration, to thereby form the dielectric oxide film 2 made of a metal oxide. Thereafter, the aluminum foil was immersed to a predetermined position in a mixture solution of 3,4-ethylenedioxythiophene, ferric p-toluenesulfonate, and 1-butanol, to thereby form the solid electrolyte layer 3 composed of a conductive polymer 3,4-ethylenedioxythiophene over the dielectric oxide film 2 by chemical oxidative polymerization. Next, the aluminum foil 1 on which the solid electrolyte layer had been formed was immersed in a solution in which carbon powder was diffused in an aqueous solution or an organic solvent, and was dried at a predetermined temperature for a predetermined duration. The just-mentioned process was repeated several times to form a carbon layer 4. Lastly, the silver paint layer 5 was formed over a surface of the carbon layer 4, whereby a capacitor element 6 was fabricated.

Next, in one side of the top and bottom sides of the capacitor element 6, an insulative resin was applied onto the boundary 15 between the anode portion 7 and the cathode portion 8 and on the adjacent region thereto, and the conductive paste 17 was applied over the silver paint layer 3c. Then, the silver paint layer 3c was layered over the cathode terminal 13 and on top of the conductive paste 17, and the conductive paste 17 and the insulative resin were thermally cured simultaneously, to thereby form the insulative resin layer 16 and to fix the silver paint layer 3c onto the cathode terminal 13 by adhesive bonding with the conductive paste 17. It should be noted that the insulative resin is applied from the boundary 15 toward the anode portion 7 side at a length of 0.3 mm to 0.5 mm. The reason is as follows. Taking the mean value of positional variations in the boundaries between the cathode portions 8 and the anode portions 7 into consideration, the advantageous effect can be obtained sufficiently when the length of the insulative resin is from 0.3 mm to 0.5 mm. If it is longer than that, a problem may arise in the resistance welding.

To thermally cure the conductive paste 17 and the insulative resin, preheating and heating according to the following specific conditions were carried out.

Preheating Conditions

Heating temperature: 60° C.

Heating time: 30 minutes

Heating Conditions

Heating temperature: 160° C.

Heating time: 120 minutes

Next, the anode portion 7 of the capacitor element 6 was connected to the anode terminal 12 by resistance welding. After the cathode portion 8 of the capacitor element 6 had been fixed to the cathode terminal 13 by adhesive bonding with the conductive paste 17 in the above-described manner, the anode portion 7 of the capacitor element 6 was connected to the anode terminal 12 by resistance welding. Next, another capacitor element 6 on which the insulative resin and the conductive paste 17 had been applied was stacked over the capacitor element 6 that had already been stacked, and another layer was stacked using the conductive paste 17 and resistance welding in the same manner as described above. This process was repeated to stack a plurality of the capacitor elements 6. Lastly, the components were sealed with an exterior resin 14, whereby a multi-layered solid electrolytic capacitor was completed.

The multi-layered solid electrolytic capacitor fabricated in this manner is hereinafter referred to as a Capacitor A1 of the invention.

Example 2

Figure 4:
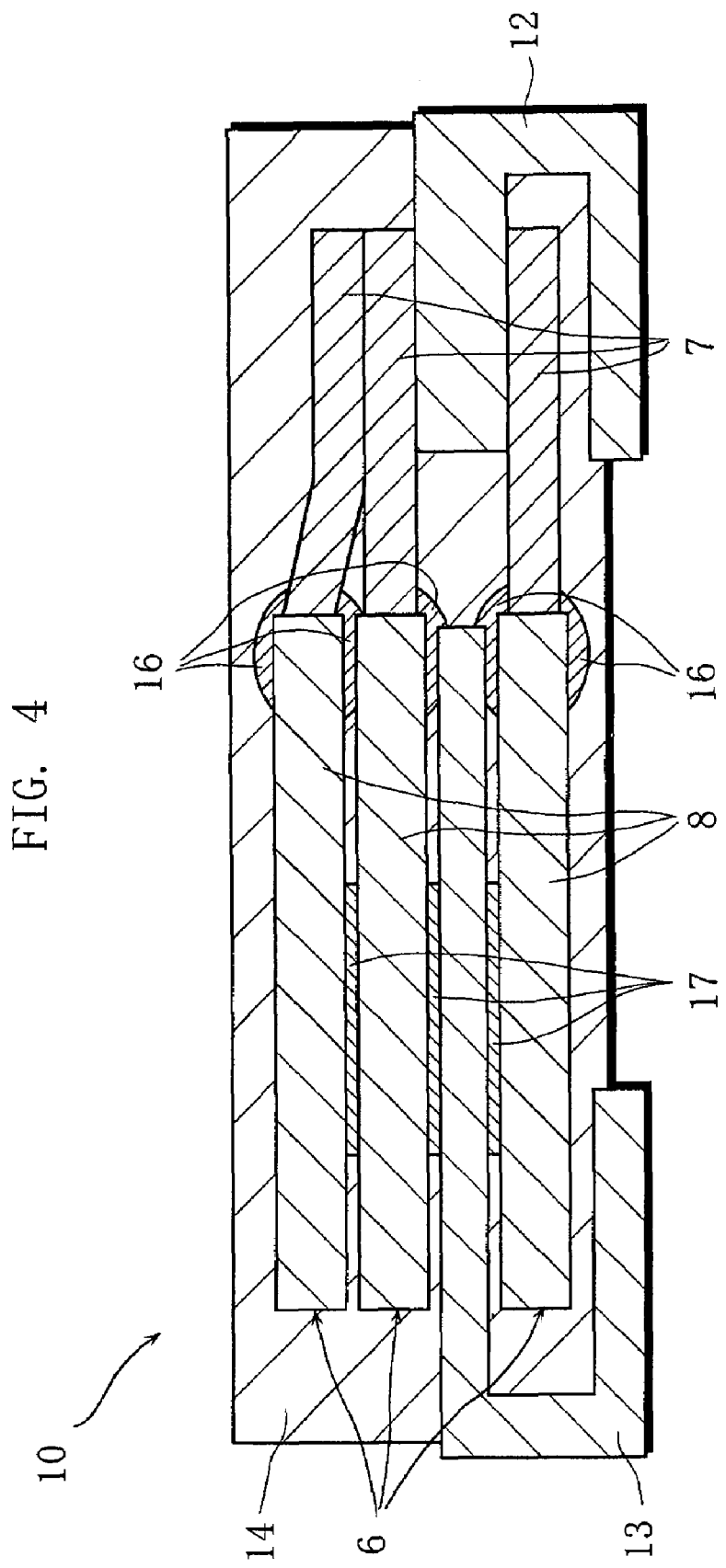
FIG. 4 is a cross-sectional view illustrating another embodiment of the multi-layered solid electrolytic capacitor according to the present invention.
Figure 5:
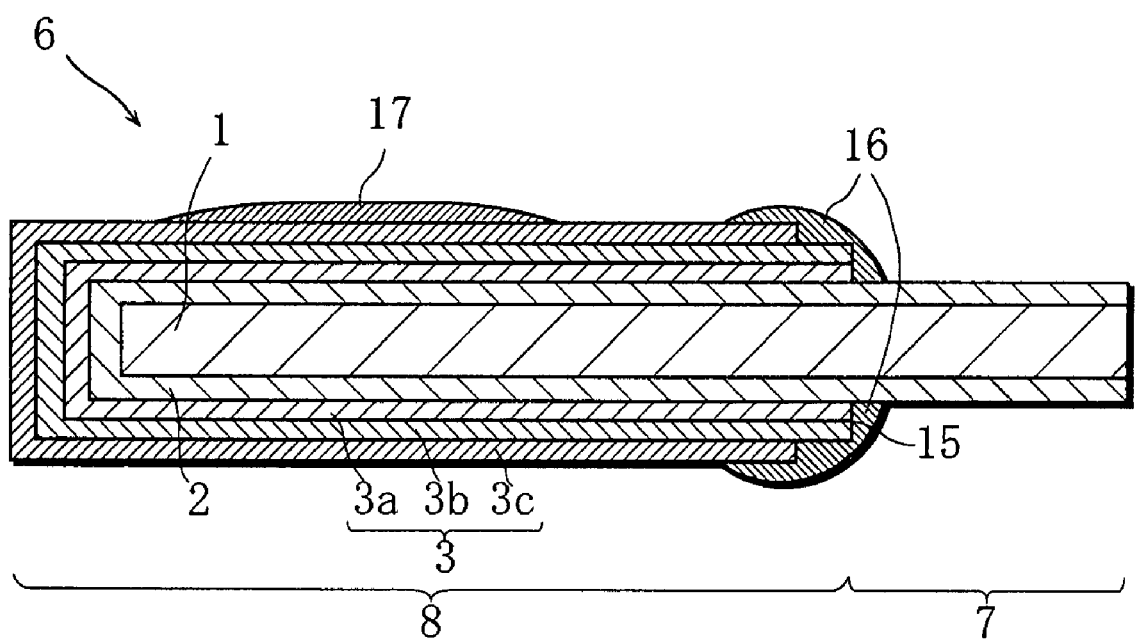
FIG. 5 is a cross-sectional view of a capacitor element used in the multi-layered solid electrolytic capacitor shown in FIG. 4.

As illustrated in FIGS. 4 and 5, a multi-layered solid electrolytic capacitor was fabricated in the same manner as that described for the capacitor A1 of the invention, except that in both the top and bottom sides of each of the capacitor elements 6, an insulative resin layer was provided on the boundary 15 between the cathode portion 8 and the anode portion 7 and on the adjacent region thereto.

The multi-layered solid electrolytic capacitor fabricated in this manner is hereinafter referred to as a Capacitor A2 of the invention.

Example 3

Figure 6:
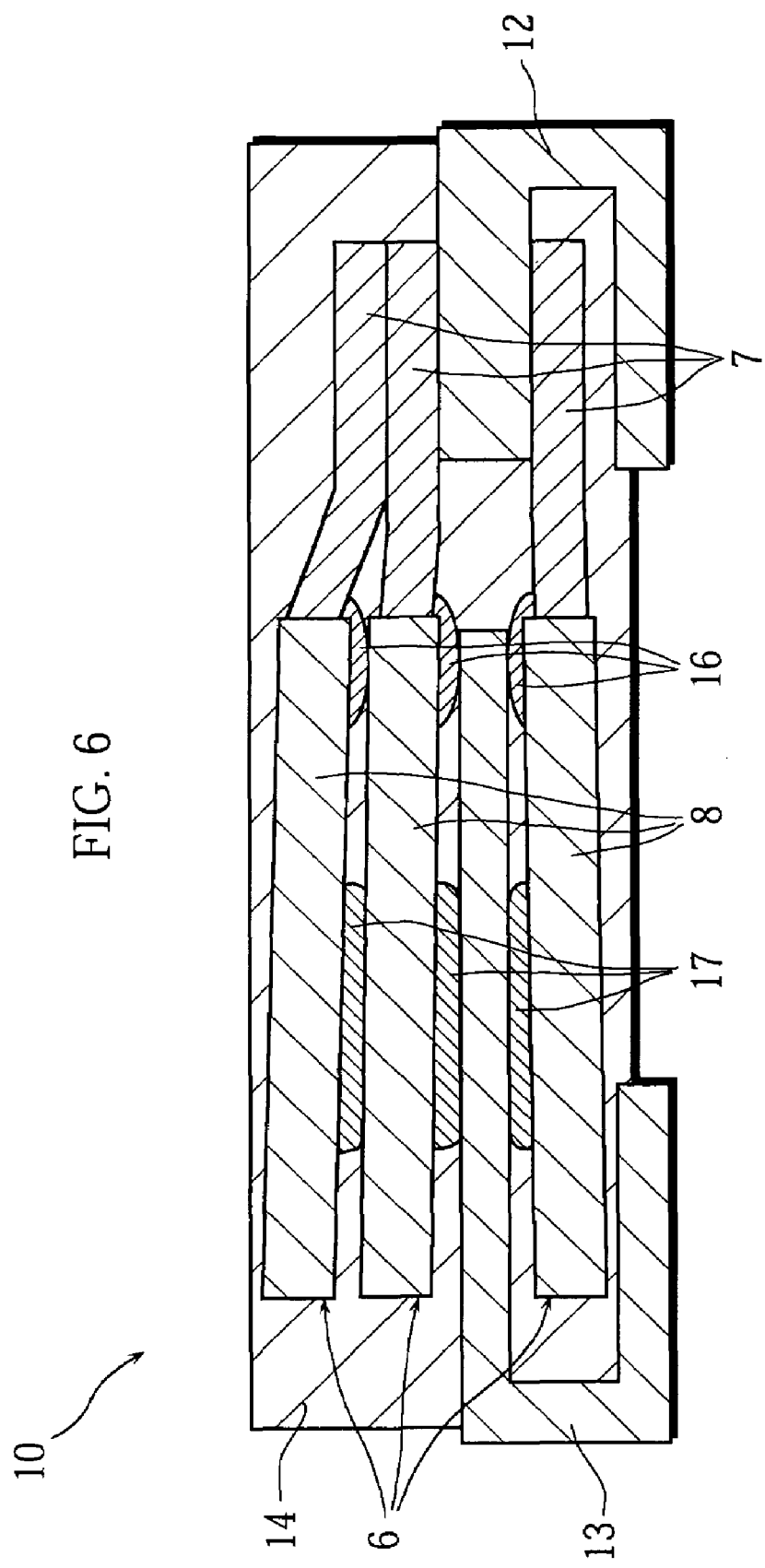
FIG. 6 is a cross-sectional view of yet another embodiment of the multi-layered solid electrolytic capacitor in the present invention.
Figure 7:
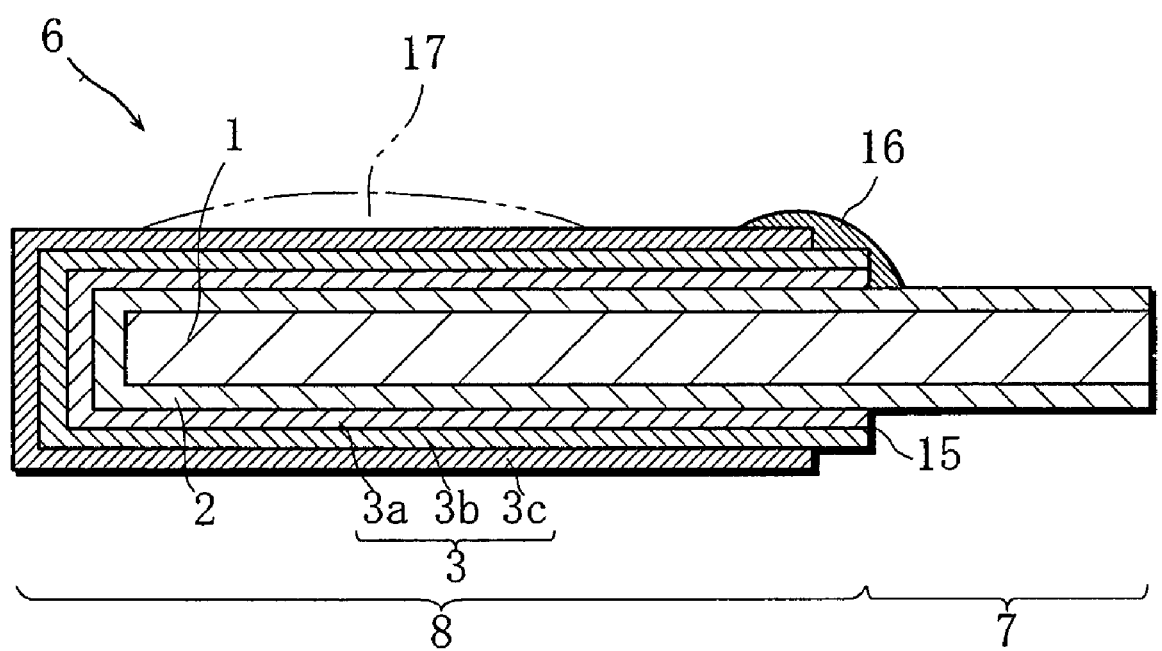
FIG. 7 is a cross-sectional view of a capacitor element used in the multi-layered solid electrolytic capacitor shown in FIG. 6.

As illustrated in FIGS. 6 and 7, a multi-layered solid electrolytic capacitor was fabricated in the same manner as that described for the capacitor A1 of the invention, except that before the capacitor elements 6 were stacked, the insulative resin was applied and thermally cured to form the insulative resin layer 16 in each of the capacitor element 6. The conditions for thermosetting the insulative resin were that the heating temperature was 120° C. and the heating time was 120 minutes.

The multi-layered solid electrolytic capacitor fabricated in this manner is hereinafter referred to as a Capacitor A3 of the invention.

Comparative Example 1

A multi-layered solid electrolytic capacitor was fabricated in the same manner as that described for the capacitor A1 of the invention, except that no insulative resin layer was provided.

The multi-layered solid electrolytic capacitor fabricated in this manner is hereinafter referred to as a Comparative Capacitor Z.

Experiment 100 samples of each of Capacitors A1 to A3 of the invention and Comparative capacitor Z were fabricated to find percentages of leakage current defectives prior to the leakage current-repairing process (aging), leakage current values (mean values), and percentages of short-circuit defectives of these multi-layered solid electrolytic capacitors. The results are shown in Table 1 below.

TABLE 1

| Capacitor | LC defective (%) | LC value (average) (μA) | Short-circuit defective (%) |
| --- | --- | --- | --- |
| Capacitor A1 | 10.65 | 1.87 | 0.0 |
| Capacitor A2 | 9.49 | 1.11 | 0.0 |

TABLE 1-continued

| Capacitor | LC defective (%) | LC value (average) (μA) | Short-circuit defective (%) |
| --- | --- | --- | --- |
| Capacitor A3 | 16.10 | 3.88 | 0.0 |
| Comparative Capacitor Z | 34.18 | 3.84 | 13.48 |

Note:
Samples with 0.1 CV or greater were determined as defective products in finding percentages of LC defectives.

Analysis of the Results of the Experiment (1) The results shown in Table 1 clearly demonstrate that Capacitors A1 to A3 of the invention were capable of preventing the short-circuit defects and they exhibited significantly lower percentages of the defective products due to leakage current than Comparative Capacitor Z.

It is believed that the results are attributable to the following reasons. In Comparative Capacitor Z, tensile stress and bending stress are applied to the boundaries 15 between the anode portions 7 and the cathode portions 8 and the adjacent regions thereto when conducting resistance welding, and the stresses are applied intensively to these parts. As a result, cracks develop at the boundaries 15 between the anode portions 7 and the cathode portions 8 or in the adjacent regions of the anode portions 7, and consequently, an increase of leakage current in the capacitor or a defective product due to short circuiting results. In contrast, in Capacitors A1 to A3 of the invention, the insulative resin layer 16 is disposed on each boundary 15 between the cathode portion 8 and the anode portion 7 and on the adjacent region thereto. Therefore, when conducting resistance welding, bending stress that is applied to the boundaries 15 between the anode portions 7 and the cathode portions 8 and to the adjacent regions thereto reduces, making the stress applied to these parts smaller. As a result, it becomes possible to reduce the defects originating from an increase in leakage current in the capacitor that is caused by cracks developed at the boundaries 15 between the anode portions 7 and the cathode portions 8 or in the adjacent regions of the anode portions. Moreover, since, in Capacitors A1 to A3 of the invention, the insulative resin layer 16 is disposed on each boundary 15 between the cathode portion 8 and the anode portion 7 and on the adjacent region thereto, the capacitor elements 6 do not easily come into contact with the electrode to be mounted or the opposite electrodes of the adjacent capacitor elements 6 do not come into contact with each other even if there are horizontal positional variations in the boundaries between the cathode portions 8 and the anode portions 7 or if variations occur in the mounting positions of the capacitor elements 6 when stacking the capacitor elements 6. For these reasons, it becomes possible to reduce the defects due to the short circuits originating from the positional variations in the boundaries between the cathode portions 8 and the anode portions 7 and the variations in the mounting positions of the capacitor elements.

(2) In addition, it is seen that Capacitor A3 of the invention shows a larger number of defectives due to leakage current than Capacitor A1 of the invention.

It is believed that the results are attributable to the following reasons. In Capacitor A1 of the invention, the insulative resin and the conductive paste are applied at the same time and are also cured at the same time after the capacitor elements have been stacked. Therefore, it is believed that the thickness of the insulative resin layer 16 is approximately equal to or less than the thickness of the conductive adhesive layer 17. On the other hand, in Capacitor A3 of the invention, only the insulative resin is applied and cured before the capacitor elements are stacked, and the conductive paste is cured after the capacitor elements have been stacked. Consequently, it is believed that the thickness of the insulative resin layer 16 is greater than the thickness of the conductive adhesive layer 17. As a result, when conducting resistance welding, the angle of the bending at the boundary at the boundary 15 between the anode portion 7 and the cathode portion 8 is greater than that in Capacitor A1 of the invention, increasing the stress applied to the boundary 15 and to the adjacent region. As a result, the number of the defective products due to leakage current is accordingly greater.

(3) In addition, both Capacitors A1 and A2 of the invention exhibit significant effects on the reduction in the defects due to leakage current, but Capacitor A2 of the invention, in which the insulative resin layer 16 is provided on both sides, is more effective in terms of the reduction in the defects due to leakage current.

It is believed that the results are attributable to the following reason. It is believed that the effect of reducing the stress applied to each boundary 15 between the anode portion 7 and the cathode portion 8 or to the adjacent region at the time of resistance welding is greater when the insulative resin layer 16 is provided on both sides of each of the capacitor elements 6 than when the insulative resin layer 16 is provided on one side of each of the capacitor elements 6.

OTHER EMBODIMENTS (1) Although all the capacitor elements are provided with the insulative resin layer in the foregoing examples, the capacitor element that is fixed to the anode terminal by welding, for example, may not be provided with the insulative resin layer.

The reason is as follows. The further away from the anode terminal 12 the anode portion 7 of the capacitor element 6 is, the greater the bending of the anode portion 7 of the capacitor element 6 tends to be. Therefore, in the first one of the capacitor elements 6 that is mounted onto the anode terminal 12, the resistance welding causes the anode portion 7 to produce no bending or a very small bending, if any, so there will be little problem if no insulative resin layer is provided.

Figure 8:
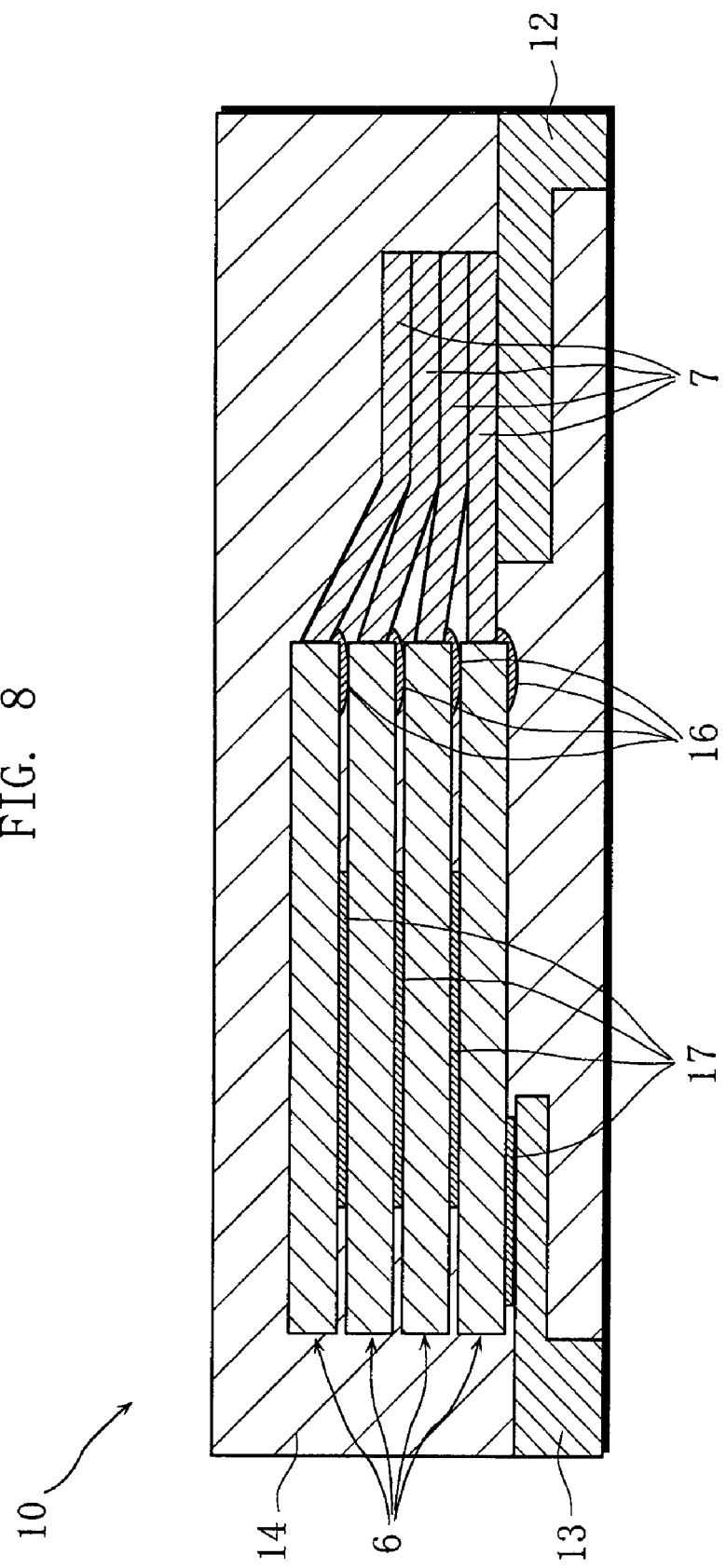
FIG. 8 is a cross-sectional view of still another embodiment of the multi-layered solid electrolytic capacitor in the present invention.
Figure 9:
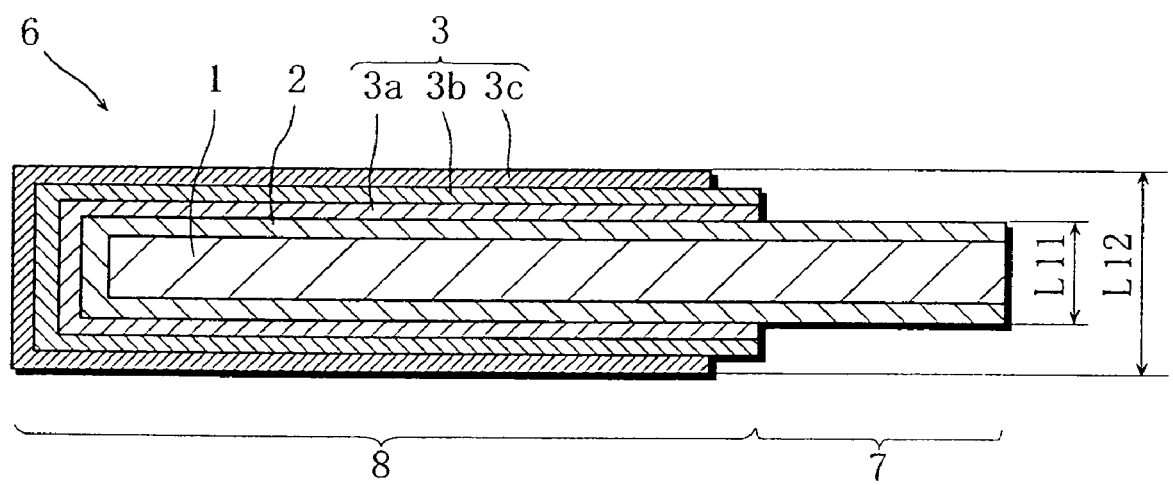
FIG. 9 is a cross-sectional view of a conventional capacitor element.
Figure 10:
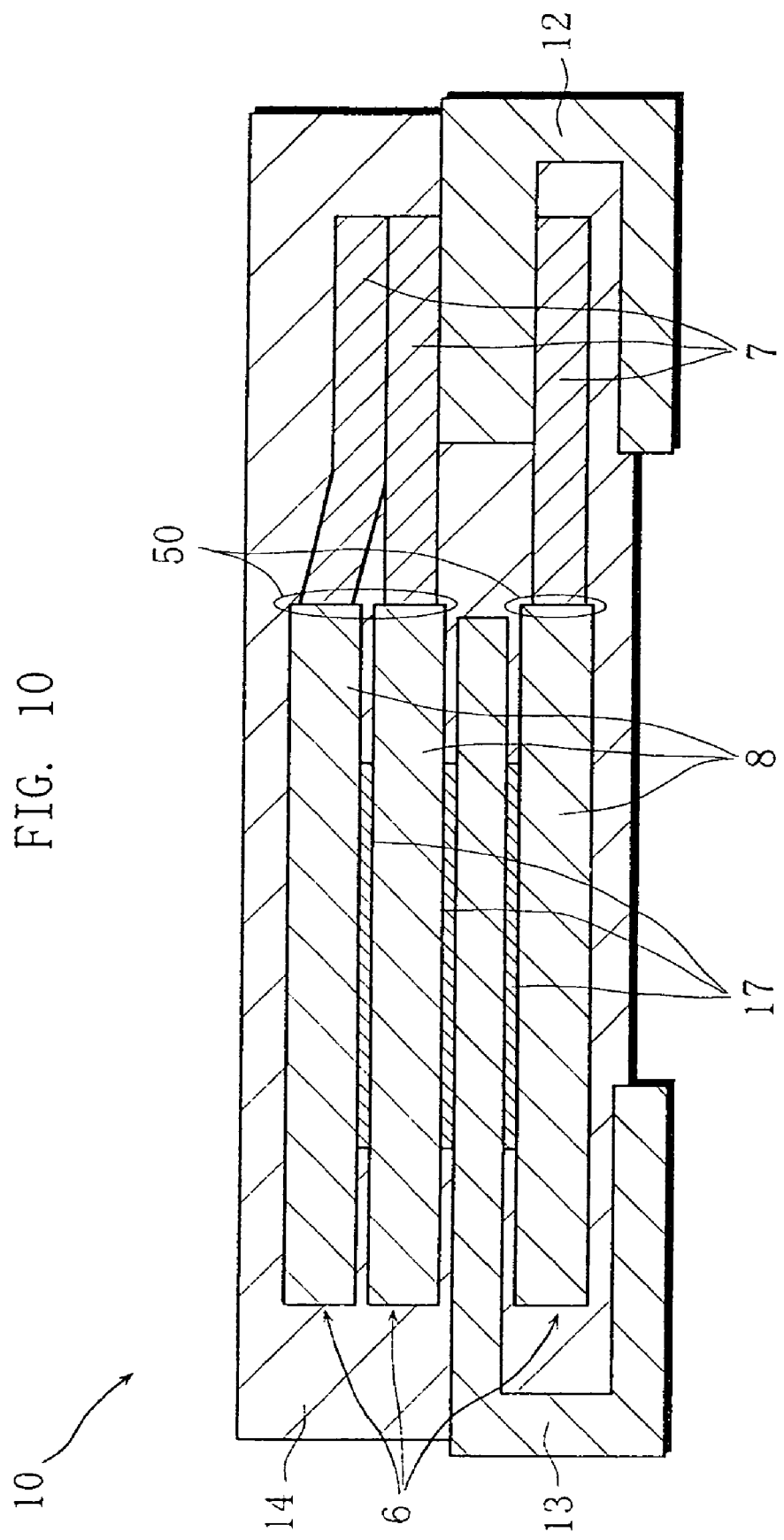
FIG. 10 is a vertical cross-sectional view of a conventional multi-layered solid electrolytic capacitor.

(2) Although the capacitor elements are disposed on both the top and bottom sides of the cathode terminal in the foregoing examples, the present invention is applicable to a multi-layered solid electrolytic capacitor in which the bottommost capacitor element is provided on the top sides of the cathode terminal and the anode terminal, as illustrated in FIG. 8.

(3) The valve metal is not limited to the aluminum, but may be tantalum, niobium, or the like. The material for the solid electrolyte layer is not limited to the polythiophene-based conductive polymer, but may be other conductive polymers such as a polypyrrole-based conductive polymer, a polyaniline-based conductive polymer, and a polyfuran-based conductive polymer, or other materials such as manganese dioxide.

(4) The present invention may be applied to, for example, memory backup power sources for mobile information terminals such as in mobile telephones, notebook computers, and PDAs.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A multi-layered solid electrolytic capacitor comprising;
an anode terminal;
a plurality of capacitor elements stacked on one another, each of the capacitor elements comprising an anode body having an anode portion, and a cathode portion having a dielectric oxide film and a cathode layer successively formed on a surface of the anode body; and
an insulative resin layer disposed on a boundary between the cathode portion and the anode portion of at least one of the plurality of capacitor elements and on an adjacent region thereto, wherein
one of the anode portions that is adjacent to the anode terminal is fixed to the anode terminal by welding, adjacent ones of the anode portions are fixed to one another by welding, and adjacent ones of the cathode portions are electrically connected to one another by a conductive paste layer,
the insulative resin layer straddling the boundary between the cathode portion and the anode portion.

2. The multi-layered solid electrolytic capacitor according to claim 1, wherein the resin layer is formed on both sides of the at least one of the capacitor elements.

3. The multi-layered solid electrolytic capacitor according to claim 2, wherein the resin layer is provided only for the capacitor elements other than the capacitor element fixed to the anode terminal by welding.

4. The multi-layered solid electrolytic capacitor according to claim 3, wherein the resin layer has a thickness equal to or less than the thickness of the conductive paste layer.

5. The multi-layered solid electrolytic capacitor according to claim 2, wherein the resin layer has a thickness equal to or less than the thickness of the conductive paste layer.

6. The multi-layered solid electrolytic capacitor according to claim 2, wherein the resin layer is made of a thermosetting resin comprising an epoxy resin.

7. The multi-layered solid electrolytic capacitor according to claim 1, wherein the resin layer is provided only for the capacitor elements other than the capacitor element fixed to the anode terminal by welding.

8. The multi-layered solid electrolytic capacitor according to claim 7, wherein the resin layer has a thickness equal to or less than the thickness of the conductive paste layer.

9. The multi-layered solid electrolytic capacitor according to claim 7, wherein the resin layer is made of a thermosetting resin comprising an epoxy resin.

10. The multi-layered solid electrolytic capacitor according to claim 1, wherein the resin layer has a thickness equal to or less than the thickness of the conductive paste layer.

11. The multi-layered solid electrolytic capacitor according to claim 10, wherein the resin layer is made of a thermosetting resin comprising an epoxy resin.

12. The multi-layered solid electrolytic capacitor according to claim 1, wherein the resin layer is made of a thermosetting resin comprising an epoxy resin.

13. A method of manufacturing a multi-layered solid electrolytic capacitor, comprising;
preparing a plurality of capacitor elements, each capacitor element comprising a cathode portion and an anode portion, the cathode portion having a dielectric oxide film and a cathode layer successively formed on a surface of an anode body and the anode portion extending from the cathode portion;
applying a thermosetting conductive paste on the cathode portions, and applying a thermosetting resin to a boundary between the cathode portion and the anode portion of at least one of the plurality of the capacitor elements and to an adjacent region to the boundary in such a manner that the thermosetting resin straddles the boundary between the cathode portion and the anode portion, and after stacking the capacitor elements, curing the thermosetting conductive paste and the thermosetting resin by heating; and fixing an anode terminal to the anode portions of the capacitor elements by welding.

14. The method according to claim 13, wherein, in the step of applying a thermosetting resin, the resin is applied onto both sides of the at least one of the capacitor elements.

15. The method according to claim 14, wherein, in the step of applying a thermosetting resin, the resin is applied to the capacitor elements other than the capacitor element fixed to the anode terminal by welding.

16. The method according to claim 15, wherein the resin comprises an epoxy resin.

17. The method according to claim 14, wherein the resin comprises an epoxy resin.

18. The method according to claim 13, wherein, in the step of applying a thermosetting resin, the resin is applied to the capacitor elements other than the capacitor element fixed to the anode terminal by welding.

19. The method according to claim 18, wherein the resin comprises an epoxy resin.

20. The method according to claim 13, wherein the resin comprises an epoxy resin.

* * * * *

UNITED STATES PATENT AND TRADEMARK OFFICE
CERTIFICATE OF CORRECTION

PATENT NO.        : 7,400,492 B2
APPLICATION NO.   : 11/785289
DATED             : July 15, 2008
INVENTOR(S)       : Hiromichi Baba et al.

It is certified that error appears in the above-identified patent and that said Letters Patent is hereby corrected as shown below:

On the Title Page;
In Item [73] Assignee, change "Sanyo Electric Co., Ltd." to be --Sanyo Electric Co., Ltd.; Saga Sanyo Industries Co. Ltd.--

Signed and Sealed this

Tenth Day of November, 2009

David J. Kappos
*Director of the United States Patent and Trademark Office*